United States Patent
Gilboa et al.

(10) Patent No.: US 6,209,592 B1
(45) Date of Patent: Apr. 3, 2001

(54) SELF-CLOSING CAP FOR THE FILLING NECK OF A CONTAINER

(75) Inventors: Ronnie Gilboa, Beit Hillel; Oded Bashan, Carmiel; Nehemya Itay, Kfar Giladi; Moshe Aduk, Korazim, all of (IL)

(73) Assignee: On Track Innovations Ltd., Rosh Pina (IL)

(*) Notice: Subject to any disclaimer, the term of this patent is extended or adjusted under 35 U.S.C. 154(b) by 0 days.

(21) Appl. No.: 09/306,407

(22) Filed: May 6, 1999

(30) Foreign Application Priority Data

May 11, 1998 (IL) ........................................... 124424

(51) Int. Cl.⁷ ............................. B65B 1/30; B65B 31/00; B67C 3/02
(52) U.S. Cl. ............................... 141/94; 141/98; 141/351; 340/825.34; 340/825.35; 340/825.54; 705/413
(58) Field of Search ................................ 141/94, 98, 231, 141/351; 340/825.34, 825.35, 825.54; 705/413

(56) References Cited

U.S. PATENT DOCUMENTS

| 4,986,439 | 1/1991 | Ott et al. . |
|---|---|---|
| 5,241,160 | 8/1993 | Bashan et al. . |
| 5,605,182 | 2/1997 | Oberrecht et al. . |
| 5,727,608 | 3/1998 | Nusbaumer et al. . |
| 5,857,501 | * 1/1999 | Kelerich et al. ........................ 141/94 |
| 6,045,043 | * 4/2000 | Bashan et al. ........................ 235/441 |

FOREIGN PATENT DOCUMENTS

| 0736484 | 10/1996 | (EP) . |
|---|---|---|
| 2600318 | 12/1987 | (FR) . |
| 9406031 | 3/1994 | (WO) . |
| 9514612 | 6/1995 | (WO) . |
| 9532919 | 12/1995 | (WO) . |

* cited by examiner

Primary Examiner—Timothy L. Maust
(74) Attorney, Agent, or Firm—Browdy and Neimark

(57) ABSTRACT

A self-closing cap for the filling neck of a container, the self-closing cap having integral therewith a smart card having a container coil antenna for communicating with a supply station coil antenna fixed to a supply nozzle when the supply nozzle is inserted into the container through the self-closing cap.

25 Claims, 2 Drawing Sheets

SELF-CLOSING CAP FOR THE FILLING NECK OF A CONTAINER

FIELD OF THE INVENTION

This invention relates generally to automatic filling of fluid containers, and particularly to refueling of vehicles.

BACKGROUND OF THE INVENTION

So-called "Gas Management Systems" (GMS) are known and virtually eliminates the need for a gas station attendant. In such systems, there is mounted around the fuel tank inlet of a vehicle a coil antenna that is controlled by a microcontroller located discreetly within the vehicle. At the refueling site, the nozzle of the GMS system pump is fitted with a nozzle coil front-end which interfaces with the site or forecourt controlling computer.

Authorization to refuel occurs during the contact-free, two-way communication between the vehicle and the site controlling computer. When the pump nozzle enters the fuel inlet, radio frequency communication occurs between the two. Driver identification is also established at this stage providing for an additional level of security.

Where more than one driver uses a specific vehicle, GMS provides an option of issuing driver tags which must be presented to the pump front-end prior placing the nozzle into the fuel inlet. Once the computer is satisfied that this is an authorized driver and that the right fuel is about to be dispensed into the right vehicle, it initiates the flow of fuel into the car's fuel tank.

Refueling continues as long as communication is maintained between the coil antenna in the vehicle's fuel tank and the fuel nozzle. On removing the nozzle, communication is interrupted, immediately stopping the flow of fuel. All data is automatically stored on the site computer and is forwarded daily to the transaction administrators, enabling them to provide their customers with comprehensive fuel management reports.

Installation of such a system requires a mechanical mounting for fixing the coil antenna proximate the fuel tank. The coil antenna must then be wired to the antenna interface of a smart card fitted inside the vehicle thus requiring the steel body of the vehicle to be drilled so as to pass the connection cable therethrough. Whilst these are not in themselves difficult operations, they are clearly beyond the ability of most motorists and thus have to be performed by a mechanic having access to the proper tools.

U.S. Pat. No. 4,986,439 (Ott et al.) discloses a self-closing cap particularly adapted for use with the filler neck of vehicle fuel tanks. As shown in FIG. 1, the self-closing cap 11 comprises a closure ring 15 having an annular seal 23 and being attachable to the filler neck 12. A spring-biased closure flap 14 having a seal is swivel-mounted on the closure ring with two bearing arms 20 to a shaft 30 supported by a bearing block 17 inserted in a recess on the housing ring. A locking spring seated on the shaft of the bearing block biases the closure flap, with one end 29 of the spring engaging the closure flap 14 or a bearing arm 20 and the other end of the spring engaging the bearing block 17.

When used to seal a vehicle fuel tank, a fuel nozzle being part of a gas filling station may be inserted through the annular seal against the spring bias so as to urge the closure flap into an open position, whereby fuel may be pumped into the fuel tank. On removing the fuel nozzle, the spring biased closure flap returns to its closed position, thus sealing the fuel tank. By such means, no mechanical removal of the seal is required and therefore such a self-closing cap is amenable to automatic fueling systems of the kind described above.

Use of such self-closing caps still does not of itself address the problem associated with mounting the coil antenna around the fuel pipe within the vehicle. It would obviously be desirable if a simpler way were provided for achieving this objective without requiring the services of qualified personnel.

SUMMARY OF THE INVENTION

It is a particular object of the invention to allow a coil antenna to be associated with a vehicle fuel tank in such a manner that drilling of the vehicle body is unnecessary and obviating the need for a special mount.

To this end there is provided in accordance with the invention a self-closing cap for the filling neck of a container, the self-closing cap having integral therewith a smart card having a container coil antenna for communicating with a supply station coil antenna fixed to a supply nozzle when the supply nozzle is inserted into the container through the self-closing cap.

Preferably, the container is a vehicle fuel tank and the supply station is a gas station having a complementary coil antenna mounted proximate a fuel nozzle and tuned to the same frequency as the vehicle coil antenna.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 3 is a detail of the coil antenna and associated smart card circuit seen in elevation from direction III—III in FIG. 2a.

DETAILED DESCRIPTION OF A PREFERRED EMBODIMENT

Figure 1:
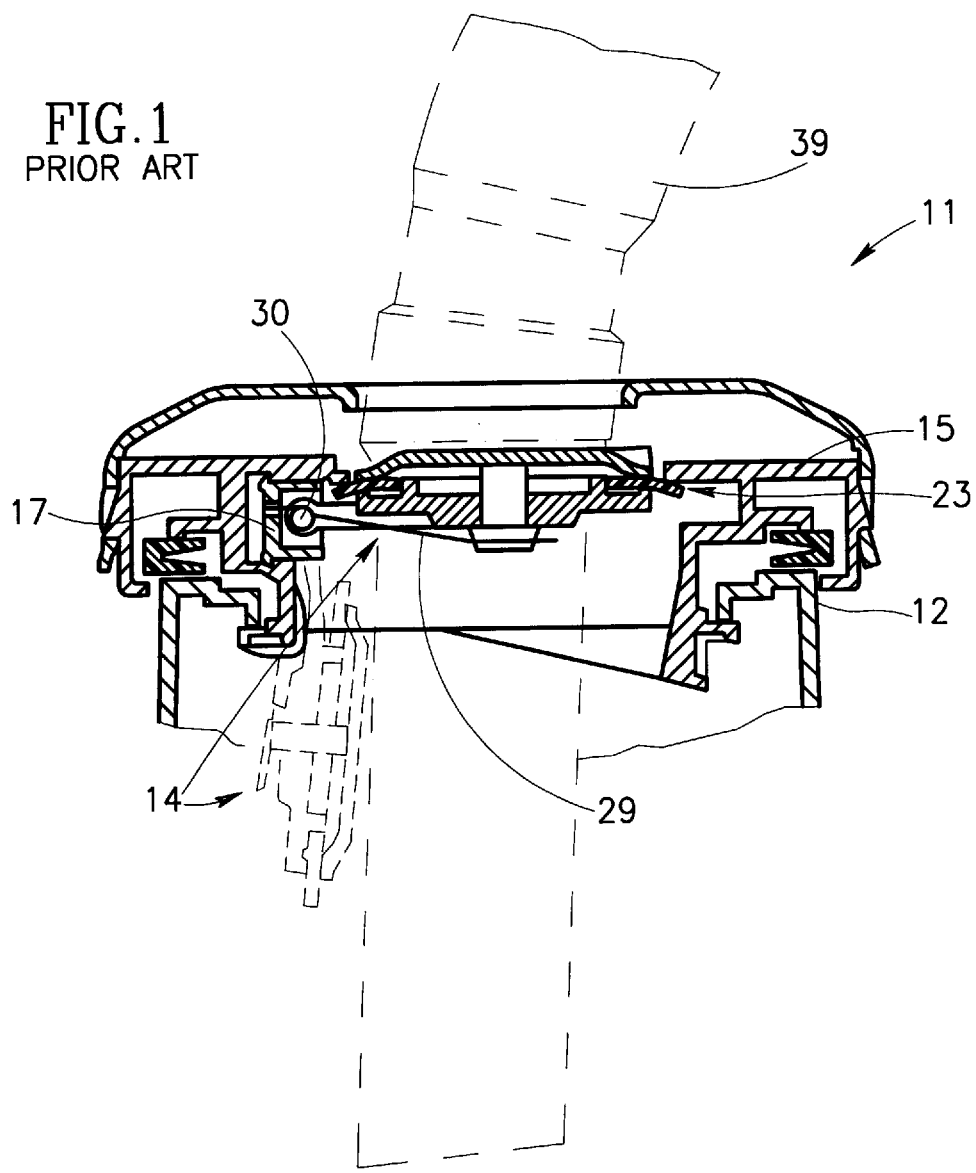
FIG. 1 is a sectional view of a prior art self-closing cap particularly adapted for use with a vehicle fuel tank.
Figure 2A:
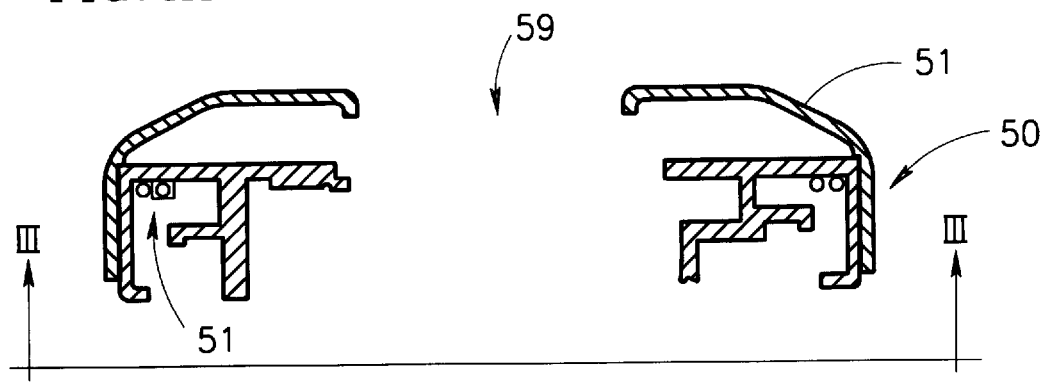
FIG. 2a is a sectional view showing schematically a detail of a self-closing cap according to the invention having an integral smart card.
Figure 2B:
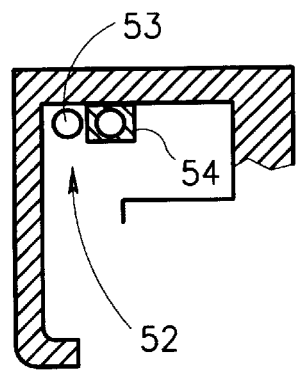
FIG. 2b is a detail of FIG. 2a showing in enlarged scale a recess within the self-closing cap for accommodating a smart card and coil antenna.

FIGS. 2a and 2b show details of a self-closing cap depicted generally as 50 having a structure similar to that of the device described above with reference to FIG. 1 as described in U.S. Pat. No. 4,986,439 which is incorporated herein by reference. The self-closing cap 50 has an outer casing 51 having in a lower surface thereof an annular recess 51. Within the annular recess 51 is wound a coil antenna 52 having one or more turns of wire 53 depending on the particular application for which the coil antenna 52 and associated electronics are intended. The coil antenna 52 is connected to a smart card depicted generally as 54 which is likewise accommodated within the recess 51.

After mounting the smart card 54 and coil antenna 52 within the recess 51, an epoxy resin is poured into the recess so that, on curing, the smart card 54 and coil antenna 52 are fixedly mounted within the recess 51. As is known, data may be written to the smart card and read therefrom using contactless communication by means of inductive coupling between the coil antenna 52 and another coil antenna (not shown) associated with a smart card reading/writing device. A suitable smart card adapted for bidirectional data communication is described in our U.S. Pat. No. 5,241,160 which is incorporated herein by reference.

Figure 3:
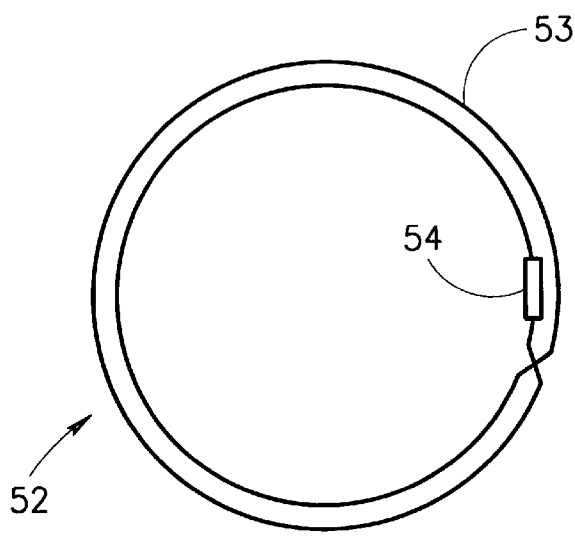

FIG. 3 is a detail of the coil antenna 52 and associated encapsulated smart card circuit 54 seen in elevation from direction III—III in FIG. 2a having two turns of wire 53, although as noted above the actual number depends on the particular application, being influenced inter alia by signal strength, frequency and so on.

Figure 4:
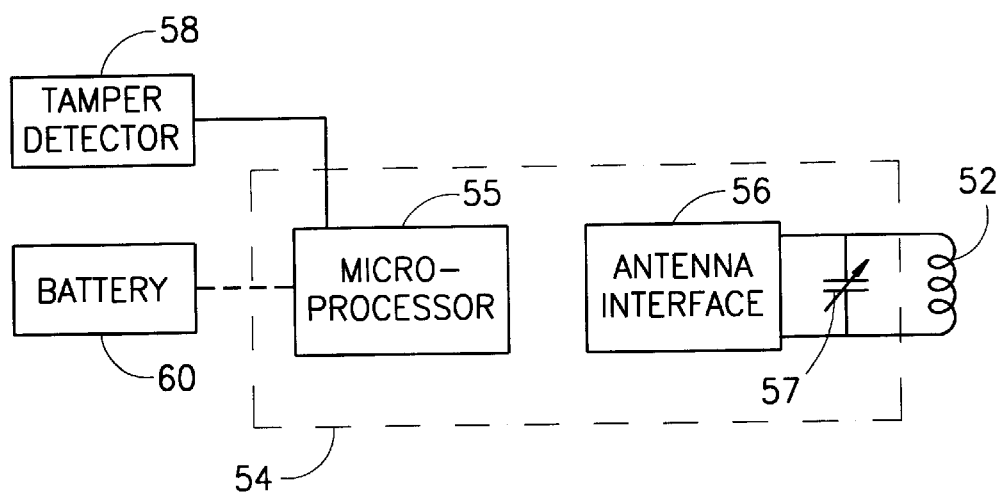
FIG. 4 is a block diagram showing functionally the smart card circuit depicted in FIG. 3.

FIG. 4 is a block diagram showing functionally the smart card circuit 54 comprising a microprocessor 55 coupled to an antenna interface 56 to which the coil antenna 52 is connected in parallel with a variable capacitor 57 allowing tuning of the smart card tuned circuit to a predetermined working frequency. In order to provide added security, a tamper detector 58 is coupled to the microprocessor 55 for providing a signal thereto in the event that the microprocessor 55 is activated either whilst the self-closing cap 50 is in its closed position; or whilst the self-closing cap 50 is not properly seated on the neck of the fuel tank. Upon receipt of a tamper detection signal, the microprocessor 55 may take suitable pre-programmed action. By such means, fraudulent use of the self-closing cap 50 and the embedded smart card 54, together with the proprietary data stored therein, may be protected against.

In use, a fuel nozzle (not shown) has mounted in association therewith a coil antenna for generating an electromagnetic field which is inductively coupled to the coil antenna 52 when the fuel nozzle is inserted into a mouth 59 of the self-closing cap 50. By such means, energy is transferred to the smart card 54 for allowing data to be communicated between the smart card 54 and a read/write station coupled to the fuel nozzle and forming part of a Gas Management System.

It will be appreciated that variations may be effected to the preferred embodiment without departing from the spirit of the invention. For example, whilst it is preferable to effect energy transfer via inductive coupling for the purpose of powering the smart card circuit 54, a miniature battery 60 may be mounted within the recess for this purpose.

The tamper detector 58 may be adapted to operate at different security levels depending on a particular application. For example, if the microprocessor 55 is self-powered when brought within the vicinity of an electromagnetic field, then only on activation will the tamper detection signal be generated. The microprocessor 55 may be programmed to give a suitable warning message and to disable further transactions. If, on the other hand, the microprocessor 55 is powered by means of a battery, the tamper detector can likewise be energized permanently so as to allow total, and optionally irreversible, de-activation of the microprocessor 55. Such total de-activation can be realized in software or in hardware. For example, a self-destructing fuse connecting the power source to the microprocessor 55 can be caused to burn out on detection of the tamper detection signal, thus achieving both total and irreversible de-actuation.

Whilst the mechanical arrangement of the self-closing cap 50 may be as described in U.S. Pat. No. 4,986,439, it will be understood that there may be equally well employed any other suitable self-closing cap which allows insertion of the fuel nozzle into the vehicle's fuel tank without requiring manual removal of the cap.

Finally, whilst the invention has been described with particular application to automatic fueling of vehicles, it is apparent that the invention may find general application to the automatic monitoring of fluid control systems. It can be used, for example, for filling central heating fuel tanks by a pre-ordered quantity of fuel whilst allowing the customer to be automatically debited.

What is claimed is:

1. A self-closing cap for the filling neck of a container, the self-closing cap having integral therewith a smart card having a container coil antenna mounted within the self-closing cap and constructed to surround a supply nozzle of a supply station when the supply nozzle is inserted into the container through the self-closing cap for communicating with a supply station coil antenna fixed to the supply nozzle.

2. The self-closing cap according to claim 1, wherein the container is a vehicle fuel tank and the supply station is a gas station having a complementary coil antenna mounted proximate a fuel nozzle thereof and tuned to the same frequency as the container coil antenna.

3. The self-closing cap according to claim 1, wherein the self-closing cap comprises an internal recess for accommodating therein the smart card and the container coil antenna substantially coaxial with the filling neck.

4. The self-closing cap according to claim 3, wherein the smart card and the container coil antenna are fixedly mounted within the recess by means of a cured epoxy resin.

5. The self-closing cap according to claim 1, wherein electrical power is inductively coupled to the smart card upon insertion of the supply nozzle into the container.

6. The self-closing cap according to claim 1, including a mount for mounting therein a battery for supplying electrical power to the smart card.

7. The self-closing cap according to claim 1, further including a tamper detector for producing a tamper detect signal upon attempted fraudulent use of the smart card within the self-closing cap.

8. The self-closing cap according to claim 7, wherein the tamper detector is adapted to produce the tamper detect signal if the smart card is activated whilst the self-closing cap is closed.

9. The self-closing cap according to claim 7, wherein the tamper detector is adapted to produce the tamper detect signal if the smart card is activated whilst the self-closing cap is not properly seated on the neck of the container.

10. The self-closing cap according to claim 7, wherein the smart card is responsive to the tamper detect signal for de-activating totally.

11. The self-closing cap according to claim 10, wherein the smart card is responsive to the tamper detect signal for de-activating irreversibly.

12. The self-closing cap according to claim 1, wherein the container coil antenna is tunably coupled to an antenna interface of the smart card so as allow tuning of a tuned circuit in said smart card to a predetermined working frequency.

13. The self-closing cap according to claim 12, wherein the coil antenna is connected in parallel with a variable capacitor so as to allow tuning of the smart card tuned circuit to said predetermined working frequency.

14. A self-closing cap for the filling neck of a container, the self-closing cap having integral therewith a smart card having a container coil antenna tunably coupled to an antenna interface of the smart card so as to allow tuning of a tuned circuit in said smart card to a predetermined working frequency for communicating with a supply station coil antenna fixed to a supply nozzle when the supply nozzle is inserted into the container through the self-closing cap.

15. The self-closing cap according to claim 14, wherein the coil antenna is connected in parallel with a variable capacitor so as to allow tuning of the smart card tuned circuit to said predetermined working frequency.

16. The self-closing cap according to claim 14, wherein the container is a vehicle fuel tank and the supply station is a gas station having a complementary coil antenna mounted proximate a fuel nozzle thereof and tuned to the same frequency as the container coil antenna.

17. The self-closing cap according to claim 14, wherein the self-closing cap comprises an internal recess for accommodating therein the smart card and the container coil antenna substantially coaxial with the filling neck.

18. The self-closing cap according to claim 17, wherein the smart card and the container coil antenna are fixedly mounted within the recess by means of a cured epoxy resin.

19. The self-closing cap according to claim 14, wherein electrical power is inductively coupled to the smart card upon insertion of the supply nozzle into the container.

20. The self-closing cap according to claim 14, including a mount for mounting therein a battery for supplying electrical power to the smart card.

21. The self-closing cap according to claim 14, further including a tamper detector for producing a tamper detect signal upon attempted fraudulent use of the smart card within the self-closing cap.

22. The self-closing cap according to claim 21, wherein the tamper detector is adapted to produce the tamper detect signal if the smart card is activated whilst the self-closing cap is closed.

23. The self-closing cap according to claim 21, wherein the tamper detector is adapted to produce the tamper detect signal if the smart card is activated whilst the self-closing cap is not properly seated on the neck of the container.

24. The self-closing cap according to claim 21, wherein the smart card is responsive to the tamper detect signal for de-activating totally.

25. The self-closing cap according to claim 24, wherein the smart card is responsive to the tamper detect signal for de-activating irreversibly.

* * * * *